United States Patent Office 2,762,812
Patented Sept. 11, 1956

2,762,812

ARYLCYCLOALKENYL-TERTIARY-AMINOALKYL ACETONITRILES

Sydney Archer and Arlo Wayne Ruddy, Albany, N. Y., assignors to Sterling Drug, Inc., Wilmington, Del., a corporation of Delaware No Drawing. Application August 5, 1952,
Serial No. 306,486

9 Claims. (Cl. 260—293)

This invention relates to tertiary-amines and their water-soluble salts, and intermediates thereof. These tertiary-amines carry an alkyl substituent which bears on a terminal carbon atom an aromatic group and a cycloalkenyl or cycloalkylidene radical, and they may be classed generally as aromatic substituted cycloalkenyl (or cycloalkylidene)-tertiary-aminoalkyl-methanes. They are valuable therapeutic agents and particularly useful as antispasmodics and antihistaminic agents, especially when employed in the form of water-soluble salts such as acid addition salts or quaternary ammonium salts.

These compounds have one of the following general formulas.

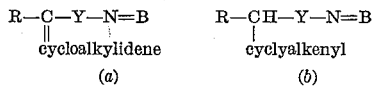

These structures are isomeric, differing only in the position of the olefinic linkage: in Formula a the double bond is exocyclic, in Formula b endocyclic. The cycloalkylidene and cycloalkenyl radicals may contain five or six carbon atoms and R represents an aromatic group. The term aromatic embraces aryl groups such as phenyl, substituted phenyl, naphthyl, xenyl, etc. as well as certain heterocyclic groups such as thienyl, pyridyl, furyl, etc. Y is an alkylene bridge of 2–3 carbon atoms and —N=B is a tertiary-amino group. Specific examples of the group —N=B include dimethylamino, ethylmethylamino, diethylamino, dipropylamino, dibutylamino, piperidyl, 2-methylpiperidyl, pyrrolidyl, 2-methylpyrrolidyl, morpholinyl, etc. These may be classed together as aliphatic tertiary-amino groups; the heterocyclic rings are distinctly non-aromatic in character and can be thought of as two alkyl groups joined together by a divalent bridge such as —CH$_2$—, —O— or —S—.

Reactions expected to produce compounds of the formula I or II:

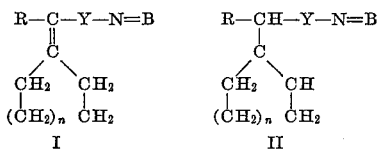

sometimes lead to the isolation of the compound corresponding to I, or may produce a compound with the Formula II. The following explanation will make this matter clear. These structures are isomeric; they differ in the position of the double bond, but are interchangeable by a simple shift of a hydrogen atom. In a reaction medium of the sort used in these syntheses in which a strong base is present, a tautomeric equilibrium is set up between these two forms. The relative amounts of the two forms present at equilibrium, depend upon the species involved, and the form actually isolated depends not only upon this ratio but upon the physical properties of the two forms. The more insoluble, more easily crystallizable form will be more readily isolated. This multiplicity of variables makes it difficult to predict whether the final product will have the structure I or II. Once obtained, the structure of the compound can readily be proved by oxidation studies. Selective oxidation using ozone or potassium permanganate causes cleavage of the molecule at the double bond and the introduction of a carbonyl or carboxyl group at the points of cleavage. The Formula I when subjected to such an oxidation gives a basic ketone and a neutral moiety, either cyclopentanone or cyclohexanone, both easily identified. Formula II upon such oxidation gives an amino aldehyde or an amino acid and no neutral material. Moreover, we have found that in many cases, the ultra-violet absorption spectra will reveal the position of the double bond in these two alternative structures. Formula I has the double bond in conjugation with the aromatic nucleus and tends to show a maximum of absorption at 240–250 m$\mu$ with the logarithm of the molar extinction coefficient (log E$_M$) approximately 4, similar to that shown by styrene and substituted styrenes. In Formula II the double bond is isolated and the value of log E$_M$ in the neighborhood of 240–250 m$\mu$ tends to be much lower.

These compounds are generally used in the form of water-soluble salts such as those produced by the addition of acids. The acids which may be used to prepare the salts are those which produce, when combined with the free bases, salts whose anions are relatively innocuous to the animal organism in therapeutic doses of the salts, so that the beneficial physiological properties inherent in the free bases are not vitiated by side-effects ascribable to the anions. Appropriate acid addition salts are those derived from mineral acids such as hydrochloric acid, hydrobromic acid, hydriodic acid and sulfuric acid; and organic acids such as acetic acid, citric acid and tartaric aid. Our compounds may also be used in the form of ammonium salts derived from lower alkyl esters of strong inorganic acids, organic sulfonic acids and the like, such as methyl chloride, methyl bromide, methyl iodide, ethyl bromide, ethyl iodide, propyl bromide, propyl iodide, methyl sulfate, methyl benzenesulfonate, methyl p-toluenesulfonate, etc.

Our compounds show consistently high antispasmodic and moderate antihistaminic activity. They are effective both against barium chloride induced spasms (musculotropic), showing from ten to seventy times the activity of papaverine; and against acetylcholine induced spasms (neurotropic), showing from one to eight percent of the activity of atropine. Although atropine possesses a considerably higher neurotropic activity than our compounds and other synthetic antispasmodics, it produces many undesirable physiological side-effects. It is therefore highly desirable to find synthetic drugs which do not induce these characteristic side reactions in the organism.

Histamine has been demonstrated to play an important role in allergenic reactions, and it has been found that substances which are antagonistic to histamine often cause marked amelioration of symptoms. Our compounds have been found to be five to fifty times as effective as papaverine in counteracting the physiological effects of histamine.

Compounds of the Formulas I and II may be synthesized in the following manner. An aromatically monosubstituted acetonitrile is condensed with a cycloalkanone in the presence of a basic catalyst. The elements of water split out and the compound (III) is formed.

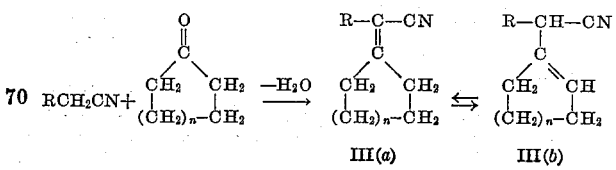

III(a)      III(b)

Specific examples of the formula RCH₂CN which may be used are phenylacetonitrile, p-anisylacetonitrile, m-anisylacetonitrile, p-tolylacetonitrile, 1-naphthaleneacetonitrile, 2-naphthaleneacetonitrile, 2-thiopheneacetonitrile, 3-thiopheneacetonitrile, 2-furanacetonitrile, 3-furanacetonitrile, 2-pyridineacetonitrile and 4-pyridineacetonitrile.

The expected structure is that of Formula III(a). However, a tautomeric shift of a hydrogen atom leads to the formation of the structure III(b) to a greater or less extent.

The compound III is then alkylated with a tertiary-aminoalkyl halide in the presence of a strong basic catalyst such as sodium amide, giving a trisubstituted acetonitrile (IV). In the following equation X is a halogen atom.

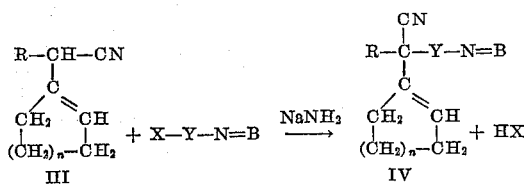

Specific examples of the compound X—Y—N=B, where X is halogen (preferably chlorine, bromine or iodine) include beta-diethylaminoethyl halide, beta-dimethylaminoethyl halide, beta-(ethylmethylamino)-ethyl halide, beta-dipropylaminoethyl halide, beta-dibutylaminoethyl halide, 3-dimethylamino-1-halopropane, 3-diethylamino-1-halopropane, 1-dimethylamino-2-halopropane, 1-diethylamino-2-halopropane, 2-dimethylamino-1-halopropane, 2-diethylamino-1-halopropane, beta-(N-piperidyl)-ethyl halide, 3-(N-piperidyl)-1-halopropane, 1-(N-piperidyl)-2-halopropane, 2-(N-piperidyl)-1-halopropane, beta-(N-pyrrolidyl)-ethyl halide, 3-(N-pyrrolidyl)-1-halopropane, beta-N-(2-methylpiperidyl)-ethyl halide, beta-N-(2-methylpyrrolidyl)-ethyl halide, beta-(N-morpholinyl)-ethyl halide, 3-(N-morpholinyl)-1-halopropane, etc.

In compound IV there is no alternative structure. The double bond must be within the alicyclic ring. The final step of the synthesis involves removal of the cyanide group and its replacement by hydrogen. This is accomplished by heating the nitrile with sodium amide in a suitable inert solvent such as toluene or xylene.

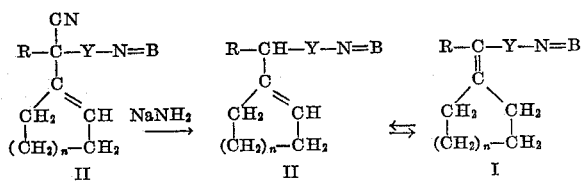

Again, with a hydrogen restored to the central carbon atom, a tautomeric shift is possible, resulting in the alternative structures, I and II. The structure which is formed to the greater extent or is more easily isolated in the form of an acid-addition salt, depends upon the individual species involved, since for each species the equilibrium ratio of the two forms will be different as well as the solubility relationships of the salts.

Compounds in which the double bond is within the alicyclic ring but does not include the carbon atom which joins the ring with the remainder of the molecule can be synthesized by the methods just described wherein a cycloalkenyl halide is employed in place of a cycloalkanone. In this case the cycloalkenyl halide has the double bond in the beta-gamma or gamma-delta position with respect to the halogen atom. In these compounds the double bond is isolated and has little opportunity to rearrange, giving a final product whose complete structure is known without further investigation.

The following examples illustrate reactions carried out by us for the preparation of the compounds of our invention. The scope of the invention, however, should not be strictly limited to the specific compounds shown herein.

Example 1

(a) *Cyclohexylidenephenylacetonitrile.*—In a 2-liter, 3-necked flask, equipped with a stirrer, thermometer and dropping funnel, was placed 600 cc. of absolute ethyl alcohol, and 23 g. of sodium was dissolved therein. Benzyl cyanide (117 cc.) was then added, and, after cooling the mixture to room temperature, 100 g. of cyclohexanone was added gradually through the dropping funnel with stirring. The reaction mixture was refluxed for 45 minutes, cooled, diluted with water and acidified with dilute hydrochloric acid. The product was extracted thoroughly with ether, and the ether layer was washed with water, sodium bicarbonate solution and again with water and dried over anhydrous sodium sulfate. After removal of the volatile solvent the residue was distilled twice at reduced pressure giving 89.5 g. of cyclohexylidenephenylacetonitrile, B. P. 125–131° C. (0.7 mm.).

(b) *(Beta - piperidylethyl) - $\Delta^1$ - cyclohexenylphenylacetonitrile.*—To a stirred suspension of 11.7 g. of finely divided sodium amide in 200 cc. of dry toluene contained in a 3-necked flask equipped with a thermometer and dropping funnel, was added 49.3 g. of the product obtained in part (a). After warming the mixture to 70° C., 37 g. of N-piperidylethyl chloride in 50 cc. of dry toluene was added dropwise, and the reaction mixture was refluxed for sixteen hours. Alcohol was then added, followed by water in order to decompose excess sodium amide. This was extracted with ether and the ether extracts washed with dilute hydrochloric acid. The acid washings were made basic with dilute sodium hydroxide and the liberated organic base extracted with ether. The ether extracts were washed with water and dried over anhydrous sodium sulfate. The ether was removed by distillation, and the crude residue of (beta-piperidylethyl)-$\Delta^1$-cyclohexenylphenylacetonitrile was converted to its hydrochloride by adding dilute hydrochloric acid in excess and stirring until crystalline. Filtration and drying gave 79.2 g. of crystalline hydrochloride, which upon recrystallization from dilute hydrochloric acid had the M. P. 206–208° C.

(c) *1 - (N - piperidyl) - 3 - phenyl - 3 - ($\Delta^1$ - cyclohexenyl)-propane.*—To a stirred suspension of 19.5 g. of finely divided sodium amide in 250 cc. of dry toluene was added 25.8 g. of (beta-piperidylethyl)-$\Delta^1$-cyclohexenylphenylacetonitrile (obtained from the hydrochloride of part (b) by the addition of excess sodium hydroxide, extraction with ether, careful drying and isolation of the free base). The mixture was refluxed for twelve hours, cooled and mixed with alcohol and water to decompose excess sodium amide. This was extracted with ether, and the ether extracts washed with dilute hydrochloric acid. The acid washings were made basic with dilute sodium hydroxide and the liberated organic base extracted with ether. The ether extracts were washed with water and dried over anhydrous sodium sulfate. The ether was removed and the residue distilled at reduced pressure, giving 13.5 g. of amine, B. P. 169–172° C. (1.5 mm.). Upon dissolving this in dilute hydrochloric acid and cooling, the hydrochloride of the amine precipitated. This was filtered and recrystallized twice from dilute hydrochloric acid giving 10 g. of the hydrochloride of 1-(N-piperidyl)-3-phenyl-3-($\Delta^1$-cyclohexenyl)-propane, M. P. 244–246° C.

Example 2

(a) *Cyclopentylidenephenylacetonitrile.*—A mixture of 23 g. of sodium dissolved in 600 cc. of absolute ethyl alcohol, 117 cc. of benzyl cyanide and 84.1 g. of cyclopentanone was caused to react in the manner described in Example 1, part (a) for the corresponding reaction using cyclohexanone. The product distilled at 134–170° C. (0.6 mm.) and partially solidified upon standing. The addition of petroleum ether (B. P. 60–70° C.) caused crystallization of phenyl acetamide which was removed by filtration. Redistillation of the filtrate gave 47 g. of cyclopentylidenephenylacetonitrile, B. P. 155–169° C. (0.6 mm.).

(b.) *(Beta-piperidylethyl)-Δ¹-cylopentenylphenylacetonitrile* was prepared from 47 g. of the cyclopentlyidenephenylacetonitrile of part (a), 38 g. of N-piperidylethyl chloride and a suspension of 11.7 g. of sodium amide in toluene by the method described in Example 1, part (b). The crude amine, 59.8 g., was not converted to the hydrochloride but was used directly in the next reaction.

(c) *1-(N-piperidly)-3-phenyl - 3 - (Δ¹ - cyclopentenyl)-propane* was prepared from 59.8 g. of crude (beta-piperidylethyl)-Δ¹-cyclopentenylphenylacetonitrile and a suspension of 31.2 g. of sodium amide in 250 cc. of dry toluene by the method described in Example 1, part (c). The free base distilled at 132–140° C. (0.4 mm.). The hydrochloride was prepared by dissolving the free amine in dry ether and adding an excess of alcoholic hydrogen chloride. The crude solid which precipitated was filtered, recrystallized once from isopropyl alcohol and twice from an absolute alcohol-dry ether mixture, giving 3.7 g. of the hydrochloride of 1-(N-piperidyl)-3-phenyl-3-(Δ¹-cyclopentenyl)-propane, M. P. 227° C. (dec.).

Example 3

(a) *(Beta - diethylaminoethyl)-Δ¹-cyclohexenylphenylacetonitrile* was prepared from 41 g. of the cyclohexylidenephenylacetonitrile of Example 1, part (a), 28.3 g. of diethylaminoethyl chloride and a suspension of 9.8 g. of sodium amide in 200 cc. of toluene by the method described in Example 1, part (b). The crude basic product, 52 g. was not purified but was used directly in the next reaction.

(b) *1-diethylamino-3-phenyl-3-(Δ¹-cyclohexenyl)-propane* was prepared from 52 g. of crude (beta-diethylaminoethyl)-Δ¹-cyclohexenylphenylacetonitrile and a suspension of 27.3 g. of sodium amide in 250 cc. of dry toluene by the method described in Example 1, part (c). The free base distilled at 128–133° (0.7 mm.) and amounted to 25.2 g. The hydrochloride was prepared by dissolving the free amine in dry ether and adding an excess of alcoholic hydrogen chloride. The crude solid which precipitated was filtered, giving 21 g., M. P. 114–117° C. When recrystallized twice from a mixture of absolute alcohol and absolute ether it melted at 127–129° C.

Example 4

(a) *(Beta-dimethylaminoethyl)-Δ¹-cyclopentenylphenylacetonitrile.*—To a stirred suspension of 18.7 g. of finely divided sodium amide in 200 cc. of dry toluene was added 37.6 g. of the cyclopentylidenephenylacetonitrile of Example 2, part (a). After stirring for 30 minutes, 28.9 g. of dimethylaminoethyl chloride hydrochloride was added portionwise, and the reaction mixture was refluxed for five hours at 110° C. Alcohol was then added, followed by water to decompose excess sodium amide. This was extracted with ether and the ether extracts washed with dilute hydrochloric acid. The acid washings were made basic with dilute sodium hydroxide and the liberated organic base extracted with ether. These ether extracts were washed with water and dried over anhydrous sodium sulfate. The ether was removed by distillation leaving 38 g. of crude (beta-dimethylaminoethyl)-Δ¹-cyclopentenylphenylacetonitrile, which was used directly in the next reaction.

(b) *1 - dimethylamino-3-phenyl-3-cyclopentylidenepropane* was prepared from 38 g. of crude (beta-dimethylaminoethyl)-Δ¹-cyclopentenylphenylacetonitrile and a suspension of 23.4 g. of sodium amide in 250 cc. of dry toluene by the method described in Example 1, part (c). The free base, 21.4 g., distilled at 110–119° C. (0.5 mm.). A refractionation gave 18.3 g., B. P. 109–112° C. (0.5 mm.). The hydrochloride was prepared by the dry ether-alcoholic hydrogen chloride method. When recrystallized three times from an alcohol-ether mixture, the hydrochloride of 1-dimethylamino-3-phenyl-3-cyclopentylidenepropane was obtained in pure form, M. P. 202–204° C. (dec.).

A sample of the hydrochloride was treated with an excess of aqueous potassium permanganate solution, and the mixture was steam distilled. From the distillate was isolated considerable amounts of cyclopentanone, identified as the dibenzal derivative, thereby proving the exocyclic position of the double bond in the amine hydrochloride.

Example 5

(a) *(Beta-dimethylaminoethyl)-Δ¹-cyclohexenylphenylacetonitrile* was prepared from 28.6 g. of the cyclohexylidenephenylacetonitrile of Example 1, part (a), 20.9 g. of dimethylaminoethyl chloride hydrochloride and a suspension of 13.6 g. of sodium amide in 200 cc. of dry toluene by the method described in Example 4, part (a). The 35.4 g. of basic product obtained was used directly in the next reaction.

(b) *1-dimethylamino-3-phenyl - 3 - (Δ¹-cyclohexenyl)-propane* was prepared from 35.4 g. of crude (beta-dimethylaminoethyl)-Δ¹-cyclohexenylphenylacetonitrile and a suspension of 20.5 g. of sodium amide in 250 cc. of dry toluene by the method described in Example 1, part (c). The basic product was distilled twice at reduced pressure giving 15.4 g., B. P. 135–137° (1.0 mm.). This was converted to its hydrochloride by the ether-alcoholic hydrogen chloride method, giving, after two recrystallizations from ethyl acetate, 10.2 g., M. P. 141.5–144° C.

Example 6

(a) A mixture of 22.2 g. of sodium dissolved in 580 cc. of absolute alcohol, 142.3 g. of m-methoxybenzyl cyanide and 97 g. of cyclohexanone was caused to react in the manner described in Example 1, part (a), for the corresponding unsubstituted benzyl cyanide. The product was distilled at reduced pressure giving 157 g., B. P. 152–159° C. (0.6 mm.).

(b) *(Beta-piperidylethyl)-Δ¹-cyclohexenyl-m-methoxyphenylacetonitrile* was prepared from 33.7 g. of the cyclohexylidene- or cyclohexenyl-m-methoxyphenylacetonitrile of part (a), 22.2 g. of N-piperidylethyl chloride and a suspension of 7 g. of sodium amide in 200 cc. of toluene by the method described in Example 1, part (b). The crude basic product, 41.8 g., was used directly in the next reaction.

(c) *1-(N-piperidyl)-3-(m-methoxyphenyl-3-(Δ¹-cyclohexenyl)-propane* was prepared from 41.8 g. of crude (beta - piperidylethyl)-Δ¹-cyclohexenyl-m-methoxyphenylacetonitrile and a suspension of 19.3 g. of sodium amide in 200 cc. of dry toluene by the method described in Example 1, part (c). The free base was distilled at reduced pressure, B. P. 174–190° C. (0.7 mm.). The hydrochloride of the base was prepared by the ether-alcoholic hydrogen chloride method. After two recrystallizations from an ether-alcohol mixture and one from a benzene-petroleum ether mixture, 38 g. of the hydrochloride, M. P. 192.5–193° C. was obtained.

Example 7

(a) *(Gamma-piperidylpropyl)-Δ¹-cyclohexenylphenylacetonitrile* was prepared from 296 g. of the cyclohexylidenephenylacetonitrile of Example 1, part (a), 29.8 g. of N-piperidylpropyl chloride hydrochloride and a suspension of 14.0 g. of sodium amide in 200 cc. of toluene by the method described in Example 4, part (a). The 39.5 g. of crude basic product obtained was used directly in the next reaction.

(b) *1-(N-piperidyl)-4-phenyl-4-(Δ¹-cyclohexenyl)-butane* was prepared from 39.5 g. of crude (gamma-piperidylpropyl)-Δ¹-cyclohexenylphenylacetonitrile and a suspension of 20 g. of sodium amide in 250 cc. of dry toluene by the method described in Example 1, part (c). The crude basic product was distilled at reduced pressure giving 16.1 g., B. P. 178–186° C. (1 mm.). Its hydrochloride was prepared by the ether-alcoholic hydrogen chloride method, giving 16.7 g. of crude material, M. P. 142–173° C. Three recrystallizations from ethylacetate gave a pure sample of the hydrochloride, M. P. 162–164° C.

Example 8

(a) (Beta - dimethylaminoethyl) - $\Delta^1$ - cyclohexenyl-m - methoxyphenylacetonitrile was prepared from 33.7 g. of the cyclohexylidene- or cyclohexenyl-m-methoxyphenylacetonitrile of Example 6, part (a), 21.7 g. of dimethylaminoethyl chloride hydrochloride and a suspension of 14 g. of sodium amide in 200 cc. of toluene by the method described in Example 4, part (a). The 32.9 g. of crude basic product thus obtained was used directly in the next reaction.

(b) 1 - dimethylamino - 3 - (m - methoxyphenyl) - 3 - ($\Delta^1$ - cyclohexenyl) - propane was prepared from 32.9 g. of crude (beta-dimethylaminoethyl)-$\Delta^1$-cyclohexenyl-m-methoxyphenylacetonitrile and a suspension of 17.5 g. of sodium amide in 200 cc. of dry toluene by the method described in Example 1, part (c). The crude basic product was distilled at reduced pressure, B. P. 133–153° C. (0.8 mm.). Its hydrochloride was prepared by the ether-alcoholic hydrogen chloride method. After recrystallation from a benzene-petroleum ether mixture and from ethyl acetate, a pure sample of the hydrochloride was obtained, M. P. 126–128° C.

Example 9

(a) (Beta - pyrrolidylethyl) - $\Delta^1$ - cyclohexenylphenylacetonitrile was prepared from 29.6 g. of the cyclohexylidenephenylacetonitrile of Example 1, part (a), 25.6 g. of N-pyrrolidylethyl chloride hydrochloride and a suspension of 14.0 g. of sodium amide in 200 cc. of toluene by the method described in Example 4, part (a). The 38.7 g. of crude basic product thus obtained was used directly in the next reaction.

(b) A mixture of 38.7 g. of crude (beta-pyrrolidylethyl)-$\Delta^1$-cyclohexenylphenylacetonitrile and a suspension of 20.5 g. of sodium amide in 250 cc. of dry toluene was caused to react in the manner described in Example 1, part (c). The crude basic product was distilled at reduced pressure, giving 18.4 g., B. P. 149–153° C. (0.7 mm.). Its hydrochloride was prepared by the ether-alcoholic hydrogen chloride method, giving 19.6 g. of crude material, M. P. 173–181° C. Two recrystallizations from an alcohol-ether mixture gave 5 g., M. P. 189–191° C. of what is the hydrochloride of either 1-(N-pyrrolidyl)-3-phenyl-3-cyclohexylidenepropane or 1-(N-pyrrolidyl)-3-phenyl-3-($\Delta^1$-cyclohexenyl)-propane.

Example 10

(a) A mixture of 20.2 g. of sodium dissolved in 525 cc. of absolute alcohol, 129 g. of p-methoxybenzyl cyanide and 73.5 g. of cyclopentanone was caused to react in the manner described in Example 1, part (a). The distilled product solidified, M. P. 64–66° C.

(b) (Beta-dimethylaminoethyl) - $\Delta^1$ - cyclopentenyl-p - methoxyphenylacetonitrile was prepared from 11.2 g. of the cyclopentylidene- or cyclopentenyl-p-methoxyphenylacetonitrile of part (a), 7.6 g. of dimethylaminoethyl chloride hydrochloride and a suspension of 5 g. of sodium amide in 150 cc. of toluene by the method described in Example 4, part (a). The crude basic product thus obtained was used directly in the next reaction.

(c) 1 - dimethylamino - 3 - (p - methoxyphenyl) - 3 - cyclopentylidenepropane was prepared from the total crude (beta-dimethylaminoethyl) - $\Delta^1$ - cyclopentenyl - p - methoxyphenylacetonitrile of part (b) and a suspension of 10 g. of sodium amide in 150 cc. of dry toluene by the method described in Example 1, part (c). The crude basic product was converted directly to its hydrochloride by the ether-alcoholic hydrogen chloride method. Two recrystallizations of the crude material from ethyl acetate gave a pure sample of the hydrochloride, M. P. 185.5–186.5° C.

Example 11

(a) A mixture of 16.5 g. of sodium dissolved in 430 cc. of absolute alcohol, 88.3 g. of 2-thienylacetonitrile [Blicke and Zienty, J. Am. Chem. Soc. 63, 2945–6 (1941)] and 60.5 g. of cyclopentanone was caused to react in the manner described in Example 1, part (a). Distillation of the product at reduced pressure gave 49 g., B. P. 143–150° C. This oil crystallized upon standing and when recrystallized from petroleum ether (B. P. 60–70° C.) had the M. P. 46–48° C.

(b) (Beta - dimethylaminoethyl) - $\Delta^1$ - cyclopentenyl-(2 - thienyl) - acetonitrile was prepared from 24 g. of the cyclopentylidene- or $\Delta^1$-cyclopentenyl-(2-thienyl)-acetonitrile prepared in part (a), 18.2 g. of dimethylaminoethyl chloride hydrochloride and a suspension of 12 g. of sodium amide in 200 cc. of dry toluene by the method described in Example 4, part (a). The crude base thus obtained was used directly in the next reaction.

(c) A solution of the crude (beta-dimethylaminoethyl)-$\Delta^1$-cyclopentenyl-(2-thienyl)-acetonitrile from part (b) in a suspension of 20 g. of sodium amide in 200 cc. of dry toluene was caused to react in the manner described in Example 1, part (c). The crude base was distilled at reduced pressure, B. P. 125–150° C. (1 mm.). This was converted to its hydrochloride by the ether-alcoholic hydrogen chloride method. The crude material, 11.5 g., was recrystallized from an alcohol-ether mixture and leached with ethyl acetate to remove unchanged nitrile. A pure sample of the hydrochloride of what is either 1-dimethylamino-3-(2-thienyl)-3-cyclopentylidenepropane or 1-dimethylamino-3-(2-thienyl)-3-($\Delta^1$-cyclopentenyl)-propane had the M. P. 200.5–203.5° C.

Example 12

(a) (Beta - piperidylethyl) - $\Delta^1$ - cyclopentenyl - (2-thienyl) - acetonitrile was prepared from 24 g. of the cyclopentylidene- or $\Delta^1$-cyclopentenyl-(2-thienyl)-acetonitrile prepared in Example 11, part (a), 23.3 g. of N-piperidylethyl chloride hydrochloride and a suspension of 12 g. of sodium amide in 200 cc. of dry toluene by the method described in Example 4, part (a). The crude base thus obtained was used directly in the next reaction.

(b) A solution of the crude (beta-piperidylethyl)-$\Delta^1$-cyclopentenyl-(2-thienyl)-acetonitrile from part (a) in a suspension of 20 g. of sodium amide in 200 cc. of dry toluene was caused to react in the manner described in Example 1, part (c). The free base was distilled at reduced pressure, B. P. 140–165° C. (12 mm.). This was converted to its hydrochloride by the ether-alcoholic hydrogen chloride method. The crude material, 12 g., was recrystallized three times from ethyl acetate, giving a pure sample of what is either 1-(N-piperidyl)-3-(2-thienyl)-3-cyclopentylidenepropane hydrochloride or 1-(N-piperidyl)-3-(2-thienyl)-3 - ($\Delta^1$ - cyclopentenyl) - propane hydrochloride, and having the M. P. 166–168.5° C.

Example 13

(a) $\Delta^2$-cyclopentenylphenylacetonitrile.—To a stirred suspension of finely divided sodium amide in 200 cc. of dry toluene was added 100 g. of benzyl cyanide, keeping the temperature below 40° C. After stirring for one-half hour, 87.4 g. of $\Delta^2$-cyclopentenyl chloride was slowly added at a temperature below 30° C. The reaction mixture was stirred for sixteen hours, cooled, diluted with water and acidified with dilute hydrochloric acid. The product was extracted thoroughly with ether, and the ether layer was washed with water, sodium bicarbonate solution and again with water and dried over anhydrous sodium sulfate. After removal of the volatile solvent the residue was distilled twice at reduced pressure, giving 85.6 g. (54.5%) of $\Delta^2$-cyclopentenylphenylacetonitrile, B. P. 144–151° C. (8 mm.).

(b) (Beta - dimethylaminoethyl) - Δ² - cyclopentenylphenylacetonitrile was prepared from 29 g. of Δ²-cyclopentenylphenylacetonitriie, 22.7 g. of dimethylaminoethyl chloride hydrochloride and a suspension of 15 g. of sodium amide in 250 cc. of dry toluene by the method described in Example 4, part (a). The crude base thus obtained was used directly in the next reaction. A sample was converted to its hydrochloride which when purified had the M. P. 214.5–216.5° C.

(c) 1 - dimethylamino - 3 - phenyl - 3 - (Δ² - cyclopentenyl)-propane was prepared from the total crude (beta-dimethylaminoethyl) - Δ² - cyclopentenylphenylacetonitrile of part (b) and a suspension of 25 g. of sodium amide in 250 cc. of dry toluene by the method described in Example 1, part (c). The basic product was distilled at reduced pressure giving 23.5 g. (65%), B. P. 116–117° C. (1 mm.). Part of this, 18.5 g., was converted to its hydrochloride by the ether-alcoholic hydrogen chloride method, giving 14.6 g. of crude crystalline product, M. P. 114–123° C. Two recrystallizations of this from ethyl acetate gave a pure sample of the hydrochloride, M. P. 129–132° C.

(d) Methiodide of 1-dimethylamino-3-phenyl-3-(Δ²-cyclopentenyl)-propane.—A solution of 5 g. of 1-dimethylamino-3-phenyl-3-(Δ²-cyclopentenyl)-propane and 5 cc. of methyl iodide in 25 cc. of acetone was allowed to stand overnight. Upon adding ether to the filtrate, the methiodide precipitated and was filtered, giving 8 g., M. P. 122–128° C. After one recrystallization from an acetone-ether mixture and two recrystallizations from water, 2 g. of pure methiodide, M. P. 171–173.5° C. was obtained.

*Example 14*

(a) Δ²-cyclohexenylphenylacetonitrile was prepared from 100 g. of benzyl cyanide, 137.1 g. of Δ²-cyclohexenyl bromide and a suspension of 40 g. of sodium amide in 250 cc. of dry toluene by the same method used in Example 13, part (a) for the corresponding cyclopentenyl compound. The product was distilled at reduced pressure giving 88.2 g., B. P. 168–174° C.

(b) (Beta - piperidylethyl) - Δ² - cyclohexenylphenylacetonitrile was prepared from 44.1 g. of Δ²-cyclohexenylphenylacetonitrile, 41 g. of N-piperidylethyl chloride hydrochloride and a suspension of 21 g. of sodium amide in 250 cc. of dry toluene by the method described in Example 4, part (a). The crude basic product was used directly in the next reaction. The hydrochloride of (beta-piperidylethyl)-Δ²-cyclohexenylphenylacetonitrile had the M. P. 216–218° C. (uncorr.). The methiodide had the M. P. 158–160° C.

(c) 1 - (N - piperidyl) - 3 - phenyl - 3 - (Δ² - cyclohexenyl)-propane was prepared from the crude (beta-piperidylethyl)-Δ²-cyclohexenylphenylacetonitrile of part (b) and a suspension of 34 g. of sodium amide in 300 cc. of toluene by the method of Example 1, part (c). The basic product was distilled at reduced pressure to give 18.8 g., B. P. 163–170° C. (1.1 mm.). This was converted to its hydrochloride by the ether-alcoholic hydrogen chloride method, giving 15.2 g. of crude crystalline product, M. P. 114–123° C. One recrystallization from ethyl acetate gave a pure sample of the hydrochloride of 1-(N-piperidyl)-3-phenyl-3-(Δ²-cyclohexenyl)-propane, M. P. 182–184° C. (uncorr.).

*Example 15*

(Beta - piperidylethyl) - Δ² - cyclopentenylphenylacetonitrile was prepared by a method similar to that described in Example 4, part (a). Its hydrochloride had the M. P. 229.5–231° C.

This application is a division of our copending application Serial No. 52,432, filed October 1, 1948, now U. S. Patent 2,647,122.

We claim:

1. A compound selected from the group consisting of basic nitriles of the formula $$R-\underset{R'}{\underset{|}{\overset{CN}{\overset{|}{C}}}}-Y-N=B$$

wherein R is an aromatic group selected from the group consisting of the benzene, naphthalene, biphenyl, thiophene, pyridine and furan series, Y is an alkylene bridge of from 2 to 3 carbon atoms, —N=B is a member of the group consisting of di-lower-alkylamino, piperidino, pyrrolidino, morpholino, and lower-alkylated piperidino, pyrrolidino and morpholino radicals, and R' is a cycloalkenyl group selected from the group consisting of cyclopentenyl and cyclohexenyl; and water-soluble salts thereof.

2. A water-soluble salt of a compound of the formula $$R-\underset{R'}{\underset{|}{\overset{CN}{\overset{|}{C}}}}-Y-N=B$$

wherein R is phenyl, Y is ethylene, —N=B is di-lower-alkylamino, and R' is cyclopentenyl.

3. A water-soluble salt of a compound of the formula $$R-\underset{R'}{\underset{|}{\overset{CN}{\overset{|}{C}}}}-Y-N=B$$

wherein R is phenyl, Y is ethylene, —N=B is di-lower-alkylamino, and R' is cyclohexenyl.

4. A water-soluble salt of a compound of the formula $$R-\underset{R'}{\underset{|}{\overset{CH}{\overset{|}{C}}}}-Y-N=B$$

wherein R is phenyl, Y is ethylene, —N=B is piperidino, and R' is cyclopentenyl.

5. A water-soluble salt of a compound of the formula $$R-\underset{R'}{\underset{|}{\overset{CN}{\overset{|}{C}}}}-Y-N=B$$

wherein R is phenyl, Y is ethylene, —N=B is piperidino, and R' is cyclohexenyl.

6. A water-soluble salt of (beta-piperidylethyl)-Δ¹-cyclohexenylphenylacetonitrile having the formula 7. A water-soluble salt of (beta-dimethylaminoethyl)-Δ²-cyclopentenylphenylacetonitrile having the formula 8. A water-soluble salt of (beta-piperidylethyl)-Δ²-cyclohexenylphenylacetonitrile having the formula 9. A water-soluble salt of (beta-piperidylethyl)-Δ²-cyclopentenylphenylacetonitrile having the formula
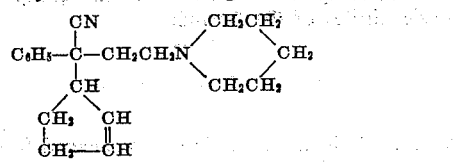
References Cited in the file of this patent
UNITED STATES PATENTS
| | | |
|---|---|---|
| 2,446,804 | Bergel et al. | Aug. 10, 1948 |
| 2,542,466 | Blicke | Feb. 20, 1951 |